United States Patent [19]

Tarr

[11] 3,719,897

[45] March 6, 1973

[54] DIGITAL TONE GENERATOR

[75] Inventor: Lloyd A. Tarr, Berkeley, Ill.

[73] Assignee: GTE Automatic Electric Laboratories, Incorporated, Northlake, Ill.

[22] Filed: Nov. 26, 1971

[21] Appl. No.: 202,472

[52] U.S. Cl. ......................331/51, 307/271, 328/48, 331/177 R

[51] Int. Cl. ..........................................H03b 19/12

[58] Field of Search ....331/51, 177, 108; 328/48, 25; 307/271, 210; 84/DIG. 11

[56] References Cited

UNITED STATES PATENTS

| | | | |
|---|---|---|---|
| 3,375,449 | 3/1968 | Ribour et al. | 328/48 |
| 3,393,366 | 7/1968 | Shoop | 328/48 |
| 3,539,926 | 11/1970 | Breikss | 307/225 |
| 3,621,403 | 11/1971 | Sely | 328/48 |
| 3,657,658 | 4/1972 | Kubo | 328/48 |

*Primary Examiner*—John Kominski
*Attorney*—K. Mullerheim et al.

[57] ABSTRACT

A generator for producing audio tones as used for signaling purposes in telecommunication systems. Selected tones are produced digitally in accordance with preprogrammed digital logic driven by a highly accurate pulse source.

9 Claims, 4 Drawing Figures

TONE GENERATOR

COUNTER 200

INVENTOR
LLOYD A. TARR

BY

AGENT

DIGITAL TONE GENERATOR

BACKGROUND OF THE INVENTION

1. Field of the Invention

This invention relates to a tone generator useful for generating audio frequency tone signals as utilized for signaling in telecommunication systems.

2. Description of the Prior Art

At the present time it has been quite common to utilize for signaling in telecommunication systems techniques known as multi-frequency (MF) signaling and touch calling. In multifrequency tone signaling, the usual arrangement involves the utilization of equipment to transmit and receive six different tone signals. Typically these signals are frequencies of 700 Hz, 900 Hz, 1100 Hz, 1300 Hz, 1500 Hz and 1700 Hz. In response to subscriber initiated signals two different tone signals are transmitted by the transmitter to a distant receiver for each digit of a desired telephone subscriber's number. For example the digit 1 might be a combination of 700 Hz and 900 Hz tones. Tone receivers at a distant point in a telecommunication network will receive these two signals and perform the necessary translation for operation of switching equipment in accordance with the transmitted digit.

In a like manner touch calling also involves tone signals. In this case the selection is made of two signals for each digit to be transmitted one from a high group and one from a low group. The low group consists of the frequencies 697 Hz, 770 Hz, 852 Hz and 941 Hz. The high group consists of the tones of 1209 Hz, 1336 Hz, 1477 Hz and 1633 Hz. Here, too, tone receivers accepting these signals are utilized to control switching equipment to perform the necessary switching for interconnection of telecommunication facilities.

To insure proper operation of switching equipment operated on MF and tone signaling basis it is essential that the generated tones be precise as far as their frequency is concerned. This is important not only during transmission but particularly so during the testing of MF and touch calling receivers when initially installed or during routine maintenance operations. Accordingly it has become a standard procedure to perform testing operations on circuits over which MF tones or touch calling tones are transmitted to determine that the tone receivers and their intervening transmission equipment are properly operating. Until now testing has been performed by utilization of standard tone generators capable of transmitting either the MF two-out-of-six tone signals or the touch calling signals employed.

In the past these tone generators have employed the use of LC oscillators. Inasmuch as the frequencies to be transmitted for the test procedures must be precise, the LC oscillators employed require careful initial tuning and periodic re-tuning to insure the transmission of accurate frequencies. Such tone generators typically employed individual LC oscillators for each tone to be transmitted, or the use of LC oscillator circuits having tapped inductors, and a common capacitor, or alternatively a common inductor and a plurality of capacitors.

SUMMARY OF THE INVENTION

The present invention is a tone generator designed for producing tone signals useful in the testing of transmission circuitry and tone receivers as utilized in telecommunication systems.

The present tone generator consists of a clock circuit operating at a frequency of 1 megahertz. This clock circuit is used to drive a counter to a predetermined number, after which it is reset. The number to which the counter is driven is determined by the grounding or application of potential to one input of an encoding matrix, which produces parallel binary outputs which are applied to a comparator circuit, consisting of a logical gating arrangement also connected to the counter. The comparator circuitry on receiving signals from the counter corresponding to the binary inputs received from the encoding matrix produces a signal which is applied to trigger a flip-flop to give a symmetric squarewave output. This squarewave output is then passed through a low pass filter having a very sharp cutoff at a frequency slightly above the highest frequency produced by the generator. This eliminates harmonics and gives a sinewave output from the filter which is then amplified and applied to the circuitry under test.

For example if a 700 Hz tone is required, grounding of the appropriate input to the encoding matrix will produce a binary signal representative of a 714 microsecond period to the comparator. With the clock operating at a 1 megahertz rate the counting chain will be operated at a 1 microsecond rate until it reaches a count of 714 at which time it will be reset. The pulse resulting at the completion of this 714 microsecond count will trigger the output flip-flop on, and after another 714 microseconds trigger it off, to be reoperated on after another 714 microsecond pulse. The resultant squarewave changing direction every 714 microseconds produces an output signal which when applied through the lowpass filter will produce an audio tone of precise value at an actual frequency of 700.2 Hz. Depending upon the stability of the oscillator employed (which is nominally crystal controlled) this resultant output signal has an error of only 0.028 percent.

The present tone generator may be programmed for producing any tone from 488.8 Hz to 500 KHz with a 2 microsecond resolution during the period. Prior art similar generators driven from a central clock source are capable of only producing submultiples of the clock frequencies. While the present generator was designed for producing those tone signals utilized in MF and touch calling signaling, tones generated in this manner might very well find ultilization for other purposes in the telecommunications field, such as busy tone, ring back tone, etc., as well as utilization in fields outside of the telecommunication area.

DESCRIPTION OF THE PREFERRED EMBODIMENT

Figure 1:
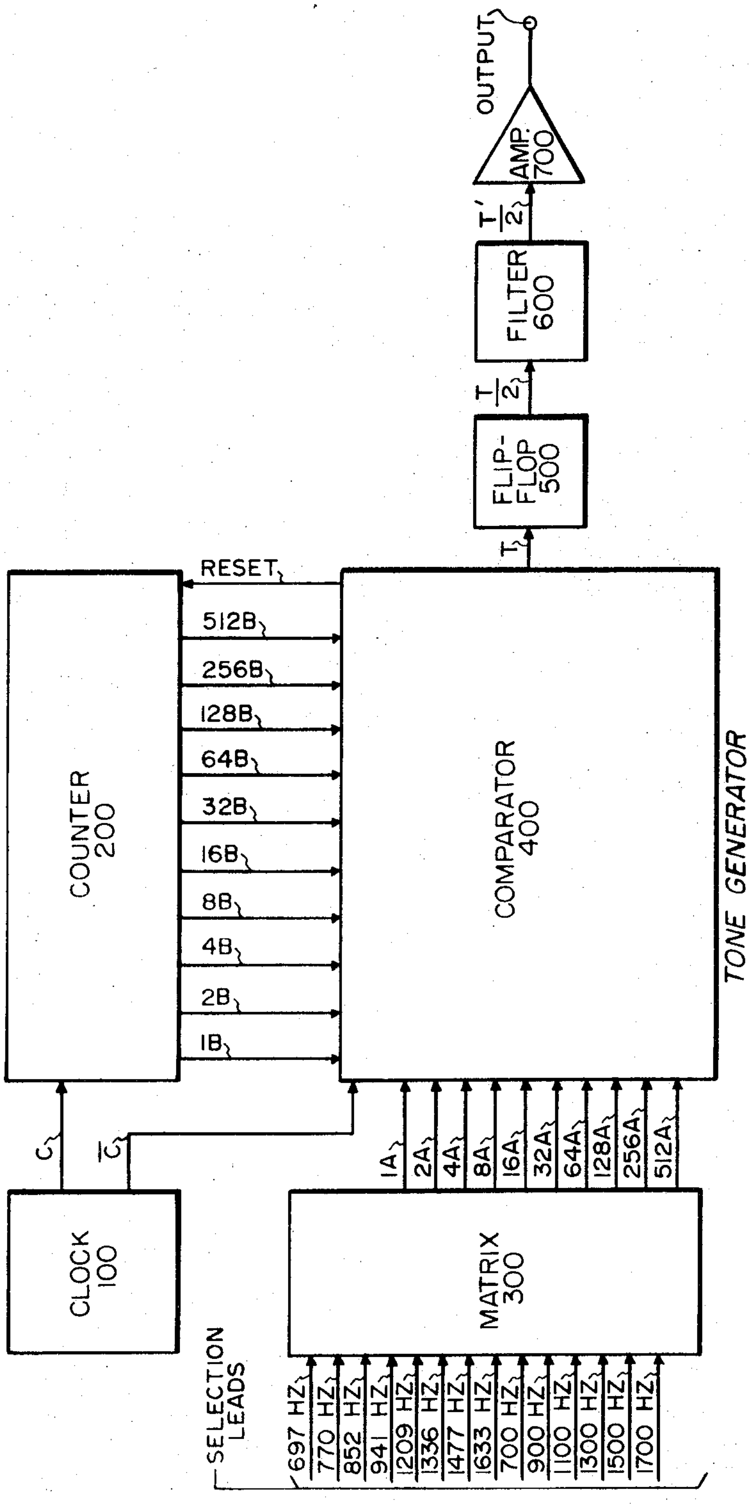
FIG. 1 is a block diagram of a digital tone generator in accordance with the present invention.

Referring now to FIG. 1, a block diagram is shown of a digital tone generator in accordance with the present invention. The generator consists of a clock circuit 100, which in the present invention consists of a crystal controlled pulse source operating at a 1 megahertz rate. The detailed circuitry of the clock circuit is conventional in nature and may take any well known form. The detailed circuitry of the clock 100 does not form a portion of the present invention. The clock circuit 100 has two outputs one of which (C) provides a pulse every microsecond to the counter circuit 200. The complementary output ($\overline{C}$) provides signals for use in the reset signal generation from comparator 400.

A counter 200 is used to generate the desired frequencies. Since a 1 megahertz crystal clock (clock 100) drives the counting chain the tones derived are very stable. The counting chain counts the output of the 1 megahertz clock. When the counter has reached 1000, for example, it will have taken 1000 microseconds. When the counter 200 reaches a selected count it will reset and immediately recount to the desired count and again reset. As the cycle continues the reset lead receives a pulse from the comparator 400, based on the frequency selection made at the inputs to the matrix 300.

Figure 2:
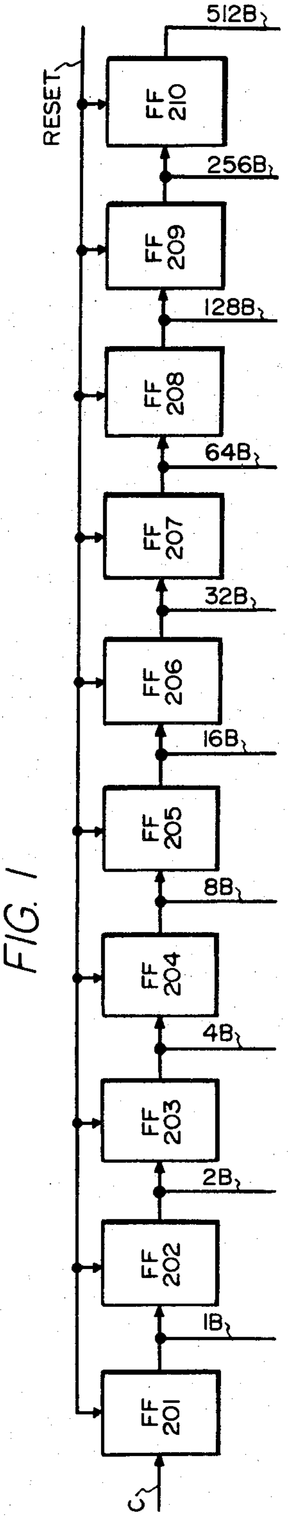
FIG. 2 is a functional diagram of a counter circuit as employed in the present invention.

As may be seen by referring to FIG. 2 the counter circuit 200 consists of ten flip-flops designated FF201 through FF210 inclusive. Each flip-flop divides its input by two. Thus the output of a preceding flip-flop is used to trigger the next flip-flop and so on. As may be noted by reference to FIG. 2 a pulse from clock 100 is applied over the C lead, putting flip-flop 201 in its true, or operated state, producing an output which is conducted to the input of flip-flop 202. After two operations flip-flop 202 produces an output which is in turn applied to flip-flop 203 and so forth. A lead is also conducted from the output of each flip-flop to the comparator circuit by leads designated 1B, 2B, 4B, etc., as shown in FIG. 2. All flip-flops are reset simultaneously by means of a signal applied to the reset lead from comparator 400.

Figure 3:
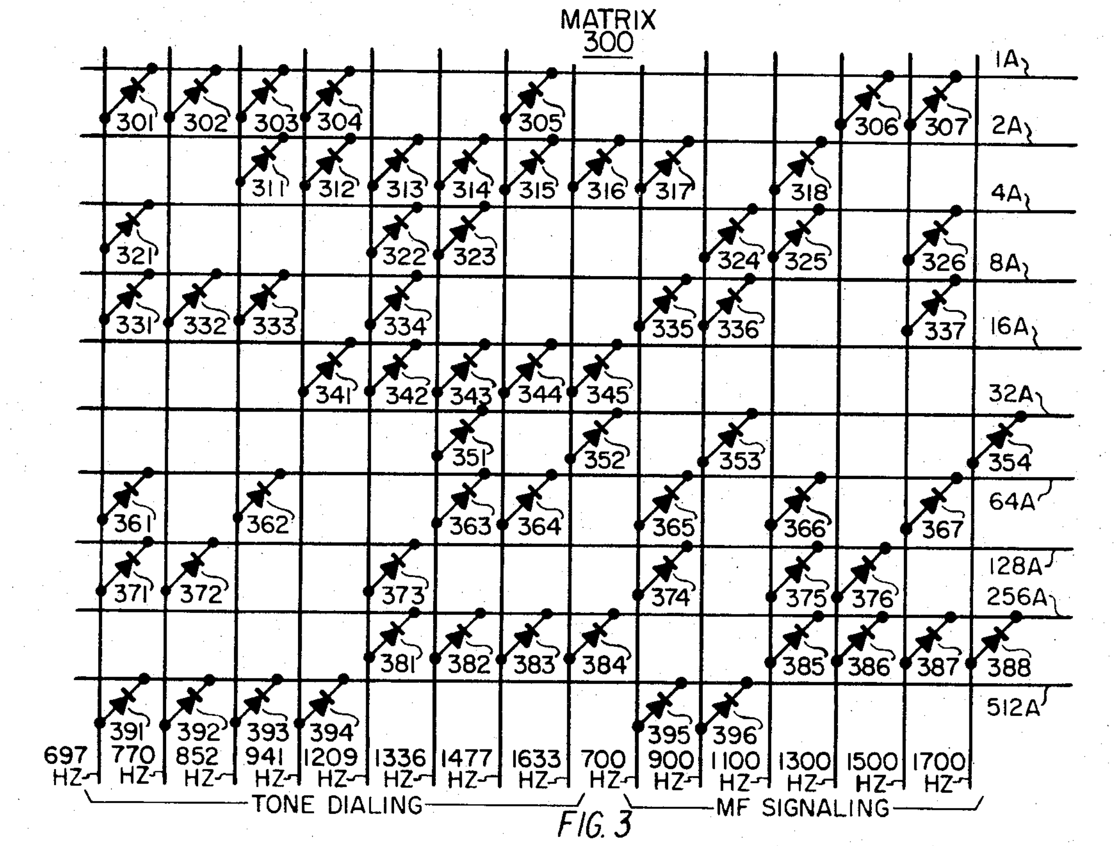
FIG. 3 is a schematic circuit diagram of a matrix circuit utilized for encoding information in the present invention.
Figure 4:
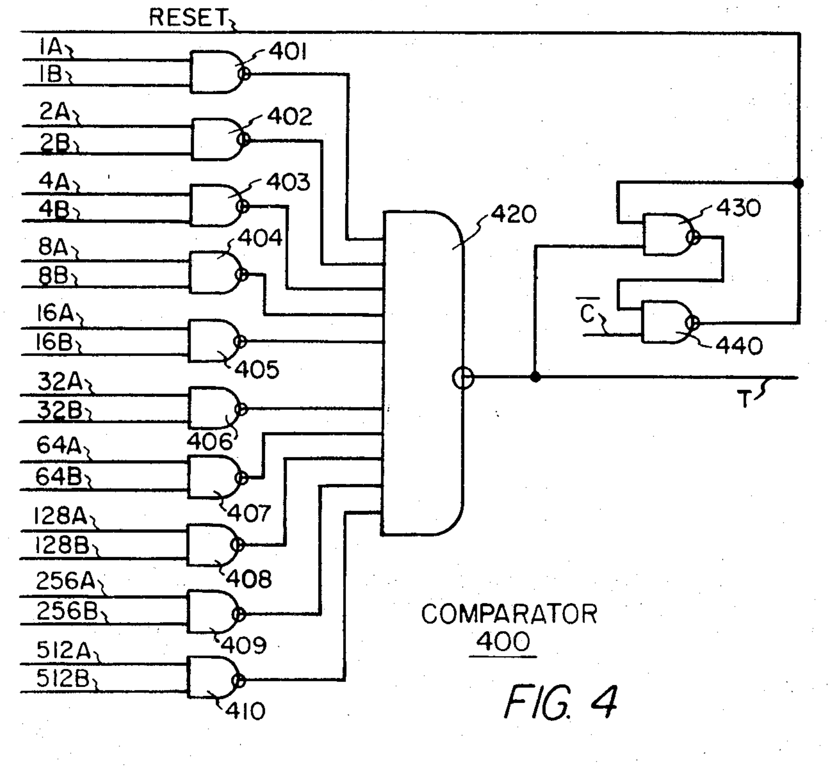
FIG. 4 is a logic diagram of a comparator circuit utilized in accordance with the present invention.

Matrix 300 acts as an encoding means for determining which count will be passed by the comparator circuit 400 to the generator output. As may be seen by referring to FIG. 3 the matrix consists of a conventional 10 × 14 matrix, programmed by means of diodes to produce binary output signals to the comparator 400, that are equivalent to the time period associated with the frequencies selected by application of potential to the selection leads that are brought into the matrix 300. These selection leads may extend from a central processing unit or other such device or may even be actuated by the operation of such simple devices as push-buttons, etc. The input leads are designated by the eight different frequency tones associated with tone dialing, viz.: 697, 770, 852, 941, 1209, 1336, 1477 and 1633 Hz as well as the six frequencies associated with MF signaling, viz.: 700, 900, 1100, 1300, 1500 and 1700 Hz. As may be noted by referring to FIG. 3 a potential applied, for example, to the 700 Hz lead included in the MF signaling group will cause potential to be extended through diodes 317, 335, 365, 374 and 395 over leads 2A, 8A, 64A, 128A and 512A respectively, to the comparator 400. The arithmetic total of the numerical designations of the leads equals 714 or half the period of a 700 Hz signal.

The comparator circuit 400 consists of logic circuitry employing NAND-gates. In the first stage of the comparator ten similar gates, each having one input lead from the counter 200 such as 1B and a matching input lead from the matrix 300 such as 1A, are included. The outputs from all ten gates (401 through 410 inclusive) are applied to a common gate designated 420 for combination to provide the reset pulse and an output signal which appears on the lead designated T.

The pulse derived from the output of gate 420 is of insufficient duration to insure proper resetting of all the flip-flops that comprise counter 200. Accordingly a pulse stretcher consisting of gates 430 and 440 is inserted between the output of gate 420 and the reset lead extending to the counter 200. This arrangement which is gated by the $\overline{C}$ output from clock 100 insures that a reset pulse of sufficient duration for effective resetting of all the flip-flops of counter 200, is applied to the reset lead.

As may be noted by reference to FIG. 1 the T output from the comparator 400 is applied to flip-flop 500 which operates to form the first portion of the output waveform and stays operated for the full count determined by the comparator circuit. For example if the desired signal is 700 Hz it would remain on for a period of 714 microseconds, after which the second signal (after a similar period) would cause the flip-flop 500 to go off, restoring it again after another 714 microseconds. This total period of 1428 microseconds is the period most closely related to that of a 700 Hz tone.

The output flip-flop 500 may assume any well known configuration and as such the circuitry thereof does not form a portion of the present invention. The resulting squarewave output from the output of flip-flop 500 is applied to filter 600. As noted previously this is a low-pass filter having in the present embodiment a very sharp cutoff at 1750 Hz to eliminate harmonics of the output signals from flip-flop 500. The resultant signal passed by filter 600 is a sinewave at the same frequency as the output signal received from flip-flop 500. It is this sinewave signal (at audio frequencies) which is applied to the input of amplifier 700 where amplification may be applied to provide the proper signal level for the circuit output. The output of the tone generator is applied to the transmission circuitry or receiver circuitry under test in a conventional manner.

In view of the foregoing description a further illustration of operation of the present invention will be presented. Assuming it is desired to transmit from the output of the digital tone generator a 1700 Hz signal, a potential will be applied either from a central processing unit or in some other means to the 1700 Hz selection lead into matrix 300. In matrix 300 the potential will be extended through diodes 354 and 388 to matrix output leads 32A and 256A respectively. These potentials are then conducted to comparator 400 and particularly to the inputs of gates 406 and 409 respectively.

Clock circuit 100 provides pulses over its C lead every microsecond to the counter 200. Counter 200 in response to these pulses counts forward in a binary manner and at such time as the count reaches 256, an output from flip-flop 209 is applied over lead 256B to gate 409. When the count of 32 is next reached, an output of lead 328 will be produced by flip-flop 206. The presence of both of these signals in combination with the potentials extended from the matrix 300 will cause an output signal to appear at the output of gate 420. This signal in combination with a $\overline{C}$ signal from clock 100 applied to gates 430 and 440 respectively will cause a reset pulse to be extended to all of the flip-flops of counter 200, restoring counter 200 to zero. At the same time the output pulse from gate 420 of the comparator circuit is applied to flip-flop 500 causing it to turn on for a total period of 288 microseconds.

Assuming selection potential is still present on the input selection lead the counter will again count to a total count of 288 microseconds (256 microseconds plus 32 microseconds) and reset flip-flop 500, and after another period of similar duration turn flip-flop 500 back on again. The total time involved for one complete (288 microsecond) "on" period for flip-flop 500 and a comparable ∓reset" period is the equivalent of one cycle of the output signal. As may be observed the duration of this signal is 576 microseconds (288 microseconds plus 288 microseconds) and this period is equivalent to the period or repetitive rate of a 1700 Hz tone signal. The resulting squarewave output from flip-flop 500 is extended through filter 600 where it is converted into a sinewave and applied to amplifier 700 for amplification to the proper level for output purposes.

While but a single embodiment has been shown of the present invention it will be obvious to those skilled in the art that numerous modifications and variations of the present design may be made without deviating from the present invention, the scope of which is limited only by the claims appended hereto.

What is claimed is:

1. A tone generator comprising: a pulse source operated to produce a plurality of periodic timing pulses at a predetermined frequency; counting means connected to said pulse source, and including a plurality of outputs, operated to count said timing pulses; encoding means including a plurality of frequency selection leads and a plurality of outputs, operative to produce a plurality of marking signals each having an assigned different numeric value, the sum of which is representative of a selected frequency; comparator means including circuit connections to said counting means outputs and to said encoding means outputs, periodically operated in response to the quantity of timing pulses counted by said counting means being equal to the mathematical sum of said marking signals, to produce output pulses at a rate proportional to a selected frequency; and conversion means connected to said comparator means operated in response to said output pulses to produce sinewave signals at said selected frequency.

2. A tone generator as claimed in claim 1 wherein there is further included: a reset circuit connected between said comparator mans and said counting means, operated in response to each of said comparator output pulses to conduct said pulse to said counting means to reset said counting means to zero.

3. A tone generator as claimed in claim 2 wherein said reset circuit includes: pulse stretching means, operated to extend the duration of said comparator means output pulses conducted to said counting means.

4. A tone generator as claimed in claim 1 wherein said pulse source comprises: a crystal controlled clock circuit.

5. A tone generator as claimed in claim 1 wherein said counting means comprise: a multistage counter, wherein each of said stages includes a bistable multivibrator.

6. A tone generator as claimed in claim 1 wherein said encoding means comprise: a preprogrammed diode matrix.

7. A tone generator as claimed in claim 1 wherein said comparator means comprise: a plurality of first gating means each including an input connection from said counting means, an input connection from said encoding means and an output connection; and second gating means including a plurality of input connections each connected to a different one of said first gating means output connections, and an output.

8. A tone generator as claimed in claim 1 wherein said conversion means comprise: a bistable multivibrator connected to the output of said comparator and low pass filter means connected to said multivibrator.

9. A tone generator as claimed in claim 8 wherein said conversion means further include: amplifier means operative to amplify the level of said sinewave signals.

* * * * *